United States Patent

Brizzi et al.

[11] Patent Number: 6,068,106
[45] Date of Patent: May 30, 2000

[54] PRODUCT CONVEYING UNIT

[75] Inventors: Marco Brizzi, Zola Predosa; Fausto Chiari, Cento, both of Italy

[73] Assignee: G.D Societa 'per Azioni, Bologna, Italy

[21] Appl. No.: 08/879,229

[22] Filed: Jun. 19, 1997

[30] Foreign Application Priority Data

Jun. 25, 1996 [IT] Italy ................ BO96A0347

[51] Int. Cl.⁷ ............................................. B65G 47/26
[52] U.S. Cl. ................................... 198/448; 198/451
[58] Field of Search ................... 198/448, 451, 198/453

[56] References Cited

U.S. PATENT DOCUMENTS

| | | | |
|---|---|---|---|
| 2,273,123 | 2/1942 | McDaniels | 198/451 X |
| 2,371,419 | 3/1945 | Bergmann | 198/451 |
| 2,404,232 | 7/1946 | Hunter | 198/451 |
| 3,753,484 | 8/1973 | Aivola et al. | 198/451 |
| 4,792,033 | 12/1988 | Iwata et al. | 198/448 X |
| 5,165,517 | 11/1992 | Auld et al. | 198/451 X |
| 5,373,930 | 12/1994 | Tsuzuki | 198/399 |
| 5,533,607 | 7/1996 | Hulse et al. | 198/448 |

FOREIGN PATENT DOCUMENTS

| | | |
|---|---|---|
| 0273228 | 7/1988 | European Pat. Off. . |
| 0574750 | 12/1993 | European Pat. Off. . |
| 1556671 | 3/1970 | Germany . |
| 2236181 | 7/1993 | Germany . |
| 2510394 | 9/1997 | Germany . |
| 2510395 | 9/1997 | Germany . |

*Primary Examiner*—James R. Bidwell
*Attorney, Agent, or Firm*—Ladas & Parry

[57] ABSTRACT

A unit for conveying products and having a main conveying device; two secondary conveying devices for feeding respective streams of products to the main conveying device via respective inputs; and a distributing device for so controlling the two streams that the products in a first of the two streams, on reaching an output of the main conveying device, are offset with respect to the products in a second of the two streams, so as to form a single succession of products through the output.

12 Claims, 6 Drawing Sheets

PRODUCT CONVEYING UNIT

BACKGROUND OF THE INVENTION

The present invention relates to a product conveying unit.

The present invention may be used to advantage for conveying packets of cigarettes, to which the following description refers purely by way of example.

In the tobacco industry, known conveying units normally feed packets of cigarettes—hereinafter referred to as "products"—from a first to a second machine; receive at their own input a stream of products from the output of the first machine; and feed the stream of products to their own output connected to the second machine.

In the event the first machine comprises more than one output for a respective stream of products, or the conveying unit is located downstream from a number of machines, each comprising a respective output for a respective stream of products, the various incoming streams entering the conveying unit must be brought together into one outgoing stream.

SUMMARY OF THE INVENTION

It is an object of the present invention to provide a product conveying unit whereby a number of incoming streams of products may be brought together into one outgoing stream through said output, without the products becoming jammed at the output.

According to the present invention, there is provided a unit for conveying products, characterized by comprising main conveying means; a first and at least a second secondary conveying means for respectively feeding a first and a second stream of products to said main conveying means; and distributing means for so controlling said first and said second stream that the products in the first stream, on reaching the main conveying means, are offset with respect to the products in the second stream, so as to form a single succession of products on the main conveying means.

In the conveying unit as defined above, said main conveying means preferably comprise an output for said succession of products; a first input for said first stream of products; and a second input for said second stream of products; said main conveying means defining a path along which the products in said two streams are fed to said output.

BRIEF DESCRIPTION OF THE DRAWINGS

Two non-limiting embodiments of the present invention will be described by way of example with reference to the accompanying drawings, in which.

DETAILED DESCRIPTION OF THE INVENTION

Figure 1:
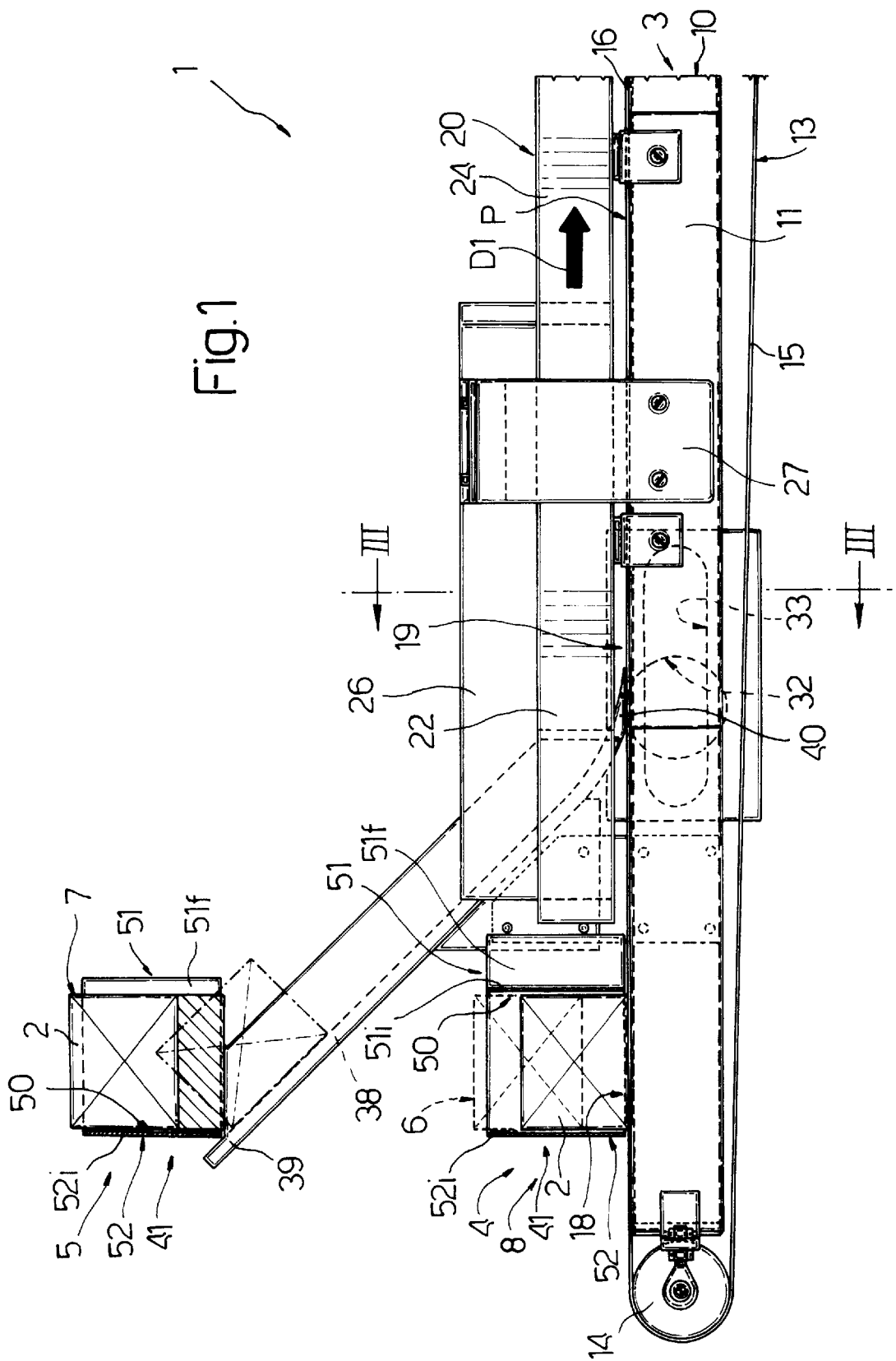
FIG. 1 shows a side view, with parts in section and parts removed for clarity, of a first preferred embodiment of the unit according to the present invention.
Figure 2:
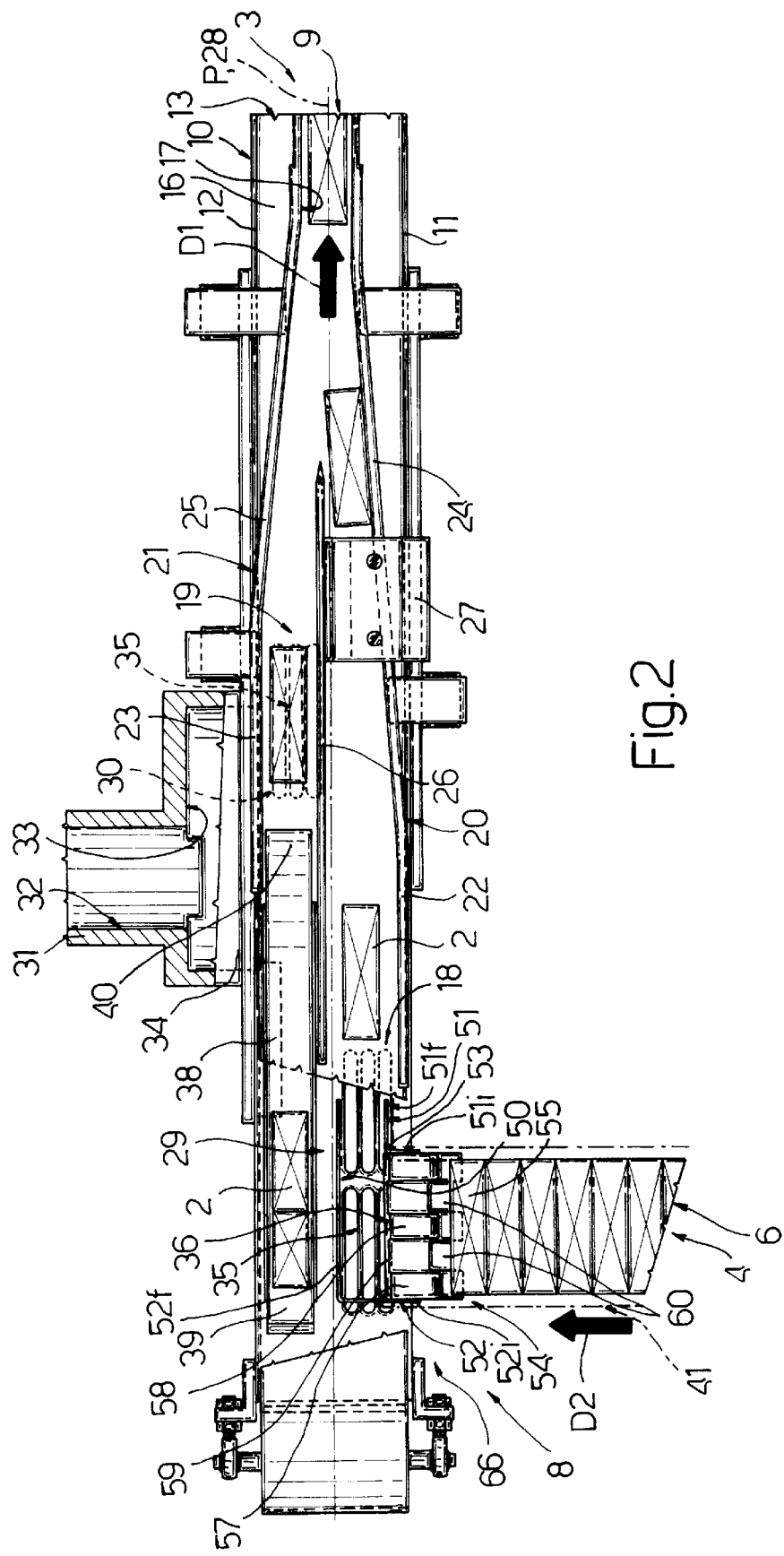
FIG. 2 shows a plan view, with parts in section and parts removed for clarity, of the FIG. 1 unit.
Figure 3:
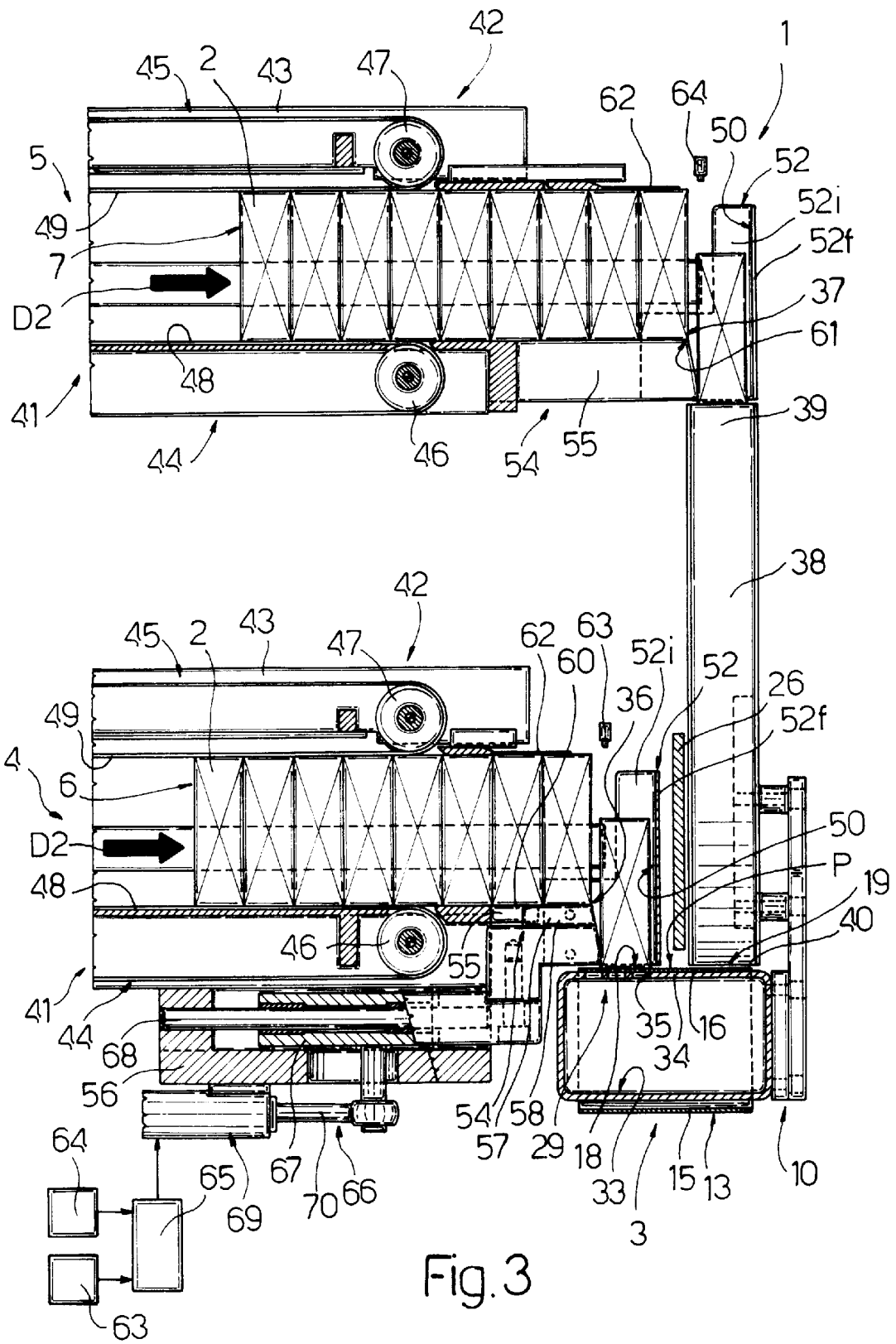
FIG. 3 shows a section along line III—III in FIG. 1.

With reference to FIGS. 1, 2 and 3, number 1 indicates a unit for conveying substantially parallelepiped products 2, each defined by a packet of cigarettes (not shown).

Unit 1 comprises a main conveying device 3; two secondary conveying devices 4 and 5 parallel to each other and for feeding respective streams 6 and 7 of products 2 to device 3; and a distributing device 8 for so controlling streams 6 and 7 that the products 2 in stream 6, on reaching device 3, are offset with respect to products 2 in stream 7, so as to form on device 3 a single succession 9 of products 2.

Main conveying device 3 comprises a frame 10 having two vertical walls 11 and 12 facing each other and extending parallel to each other along a path P of products 2 in streams 6 and 7; and a single conveyor belt 13 made of material permeable to air, looped about two transmission pulleys 14 (only one shown), and of a width greater than the thickness S of at least three products 2 positioned side by side on edge. Pulleys 14 are supported at respective opposite ends of walls 11 and 12, and define on belt 13 a return branch 15 and a transportation branch 16, which in turn defines path P and conveys products 2 in streams 6 and 7 in a traveling direction D1 with products 2 positioned on edge.

Device 3 also comprises an output 17 for succession 9 of products 2; two inputs 18 and 19 for respective streams 6 and 7; and two lateral retaining barriers 20 and 21 fitted to respective walls 11 and 12, over and crosswise to branch 16, and in turn comprising respective initial portions 22 and 23 parallel to direction D1 and alongside branch 16 at respective inputs 18 and 19, and respective end portions 24 and 25 converging from respective portions 22 and 23 so as to be separated, at output 17, by a distance approximately equal to but no less than thickness S of product 2. Device 3 also comprises a vertical partition 26 fitted to wall 12, over branch 16, by an L-shaped bracket 27, and located between and at a distance from barriers 20 and 21 approximately equal to but no less than thickness S of product 2.

Output 17 is located across the center line 28 of transportation branch 16, while inputs 18 and 19 are located in series along path P in direction D1 and on either side of center line 28 and partition 26, which is substantially located at center line 28, extends from input 18 alongside input 19 downstream from input 18 in direction D1, and terminates between end portions 24 and 25, upstream from output 17.

Main conveying device 3 also comprises two suction ports 29 and 30 located beneath transportation branch 16 of belt 13, substantially at respective inputs 18 and 19, and communicating with a known suction device 31 via a conduit 32 and a suction chamber 33, the top wall 34 of which is substantially located contacting branch 16. More specifically, each suction port 29, 30 is defined by a number of longitudinal slots 35 formed parallel to direction D1 through wall 34, and provides for drawing on to belt 13 each product 2 fed by devices 4 and 5 to respective inputs 18 and 19, so that product 2 substantially instantaneously assumes the same traveling speed V1 as belt 13.

As already stated, secondary conveying devices 4 and 5 are located parallel to each other to feed products 2 in respective streams 6 and 7 to respective inputs 18 and 19 in a direction D2 crosswise to direction D1, are located one over the other with device 4 beneath device 5, and comprise respective output openings 36 and 37 for products 2, extending parallel to direction D1 and at different heights with respect to transportation branch 16 of belt 13.

More specifically, opening 36 of device 4 is located facing and directly over input 18, whereas opening 37 of device 5 is connected to input 19 by a chute 38 forming part of device 5 and of a width substantially equal to the thickness S of product 2. Chute 38 is fitted to wall 12 of frame 10, and comprises a top end 39 just beneath opening 36, and a bottom end 40 extending between initial portion 23 of barrier 21 and partition 26, and substantially tangent to belt 13 immediately upstream from input 19.

Devices 4 and 5 are substantially similar, so that only device 4 will be described in detail, using the same numbering system for any similar parts of device 5.

Device 4 comprises a conveyor 41; and a frame 42 supporting conveyor 41 and defined by two elongated plates 43 (only one shown) extending in direction D2. Conveyor 41 comprises two conveyor belts 44 and 45, which are positioned facing each other, are looped about respective pairs of pulleys 46 and 47 (only one of each pair shown) fitted to plates 43, and comprise respective transportation branches 48 and 49 for conveying products 2 and respectively located beneath and on top of products 2. More specifically, branches 48 and 49 are horizontal branches parallel to each other and to direction D2, and respectively cooperate with the bottom and top of products 2 to feed products 2 substantially side by side with one another in direction D2.

Device 4 also comprises an output conduit 50 of conveyor 41, supported, as described in detail later on, at the output end of conveyor 41. Conduit 50 is L-shaped and defined by two lateral walls 51 and 52, each having a final portion 51f, 52f extending parallel to direction D1, substantially over belt 13 and alongside slots 35, and an initial portion 51i, 52i extending parallel to direction D2 and alongside output opening 36 of device 4. More specifically, initial portion 51i and final portion 51f of wall 51 define a vertical edge 53 flush with output opening 36 of device 4; portions 51f and 52f are separated in direction D2 by a distance approximately equal to but no less than thickness S of product 2, so as to ensure correct supply of product 2 to input 18; and portions 51i and 52i are separated in direction D1 by a distance substantially equal to the width of products 2.

Figure 4:
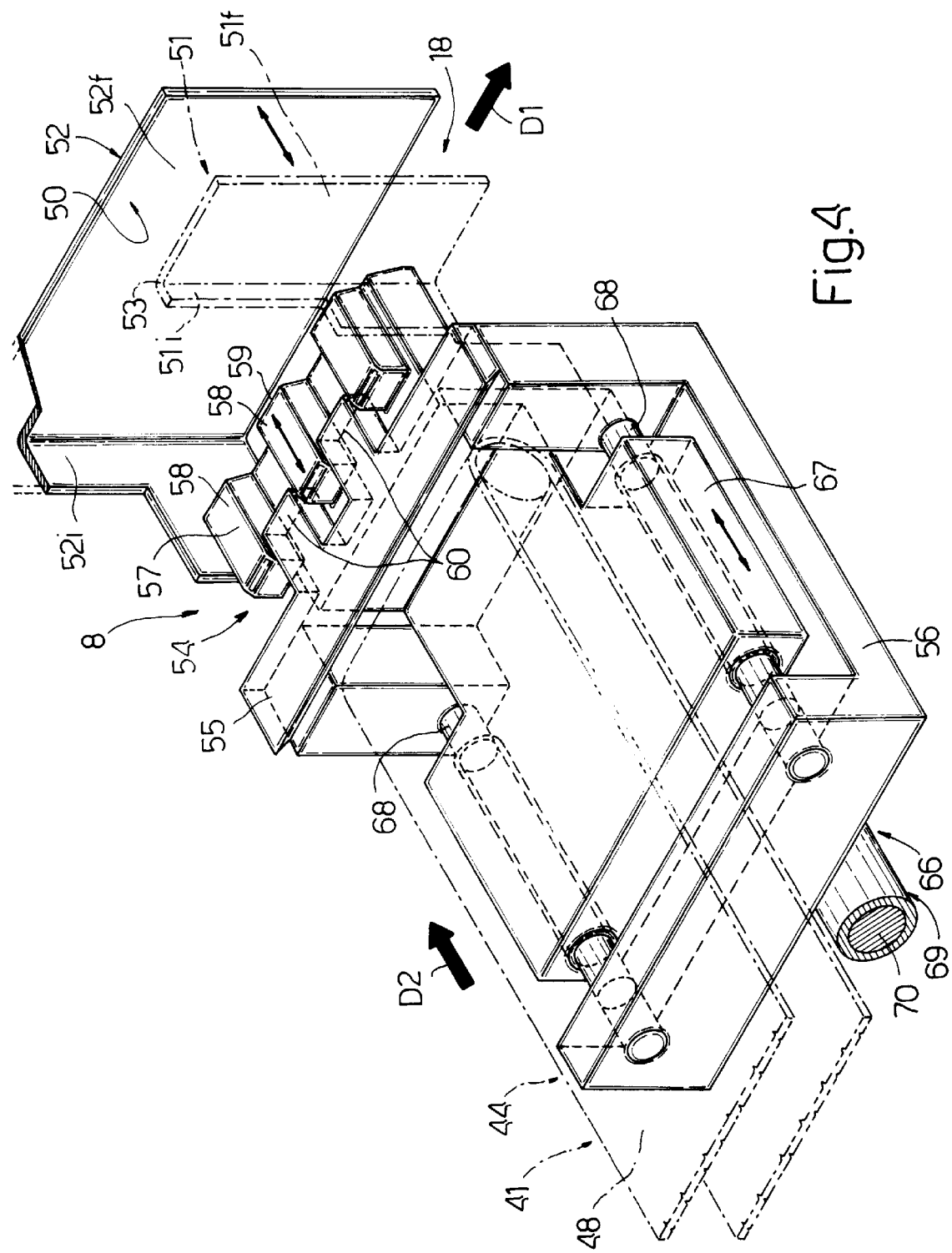
FIG. 4 shows a larger-scale view in perspective, with parts in section and parts removed for clarity, of a detail in FIG. 1.

As shown more clearly in FIG. 4, device 4 also comprises a connecting plate. 54 located between transportation branch 48 and input 18, and in turn comprising a fixed portion 55 supported adjacent to branch 48 by a supporting element 56 connected rigidly to the output ends of plates 43, and a movable portion 57 mating in sliding manner and comb-fashion with portion 55 to vary the length L of conveyor 41. More specifically, movable portion 57 is connected to portions 51i and 52i of walls 51 and 52 to support conduit 50, and comprises three substantially parallelepiped top teeth 58 located between portions 51i and 52i, and defined, on the side facing conduit 50, by a top edge 59 parallel to direction D1; and fixed portion 55 comprises, on the side facing away from branch 48, two substantially rectangular appendixes 60 projecting from portion 55 in direction D2, and which slide between teeth 58 of movable portion 57.

Unlike plate 54 of device 4, plate 54 of device 5 is located between transportation branch 48 and output opening 37, and only comprises fixed portion 55, which is located adjacent to branch 48, extends up to the top end 39 of chute 38, and is defined at the top, on the side facing chute 38, by an edge 61 parallel to direction D1 and defining a bottom edge of opening 37. In actual use, on reaching edges 59 and 61, i.e. on reaching openings 36 and 37, products 2 are pushed by the adjacent upstream products 2 over edges 59 and 61, and drop on to belt 13 at respective inputs 18 and 19.

Device 4, 5 also comprises a blade 62, which is fitted to plates 43 over plate 54 and coplanar with branch 49, defines the top of output opening 36, 37 of device 4, 5, and cooperates with products 2 on plate 54 to prevent them from toppling over as they fall over edge 59, 61.

Distributing device 8 comprises two photocells 63 and 64 located at respective inputs 18 and 19 for detecting the passage through inputs 18 and 19 of products 2 in respective streams 6 and 7; and a known control unit 65 having two inputs connected to photocells 63 and 64, an output connected to a timing device 66, and a further input connected to a known position indicator (not shown) associated with movable portion 57 of plate 54 and for communicating to unit 65 the position of edge 59, i.e. the length L of conveyor 41.

Device 66 forms part of device 8, and is activated by unit 65, on the basis of signals supplied to unit 65 by photocells 63 and 64, to so operate on products 2 in stream 6 that, on reaching output 17, products 2 in streams 6 and 7 are offset with respect to each other. In other words, products 2 in streams 6 and 7 are timed by device 66 operating solely on products 2 in stream 6 on the basis of the supply phase F1 of products 2 in stream 7. As stream 7 therefore constitutes a main stream, the phase F1 of which determines operation of timing device 66, inputs 18 and 19 therefore comprise a main input—input 19—and a secondary input—input 18.

More specifically, photocell 63 is located vertically over output opening 36 of conveying device 4, and photocell 64 vertically over opening 37, which is tantamount to positioning photocell 64 at input 19, in that, once products 2 in stream 7 are fed through opening 37, the length of chute 38, the time taken by each product 2 to slide down chute 38 and the traveling speed V1 of belt 13 need simply be known for control unit 65 to accurately determine the instant in which products 2 reach input 19, i.e. the reference instant by which to anticipate or delay supply of products 2 in stream 6 to input 18.

In addition to movable portion 57 of plate 54, device 66 also comprises a carriage 67 supporting movable portion 57 and fitted in sliding manner to element 56 by means of a pair of cylindrical guides 68 parallel to direction D2 and fitted to element 56. Device 66 also comprises a linear actuator 69 fitted to the bottom of element 56 and having an output rod 70 connected to carriage 67 to move carriage 67 in direction D2, and more specifically, to move portion 57 between a withdrawn operating position in which portion 51f of wall 51 is substantially aligned with initial portion 22 of lateral retaining barrier 20 to anticipate the fall of products 2 on to belt 13, and an extracted operating position in which portion 52f of wall 52 is substantially aligned with partition 26 to delay the fall of products on to belt 13.

In actual use, products 2 in streams 6 and 7 are fed by respective conveying devices 4 and 5 to respective openings 36 and 37; and photocells 63 and 64, in addition to determining the passage of products 2, also determine the position of products 2 with respect to inputs 18 and 19, and supply respective position signals to control unit 65.

On falling over edge 61 and through output opening 37 on to chute 38, products 2 in stream 7 slide towards input 19, where they drop on to belt 13 and, by virtue of the suction through port 30, adhere instantly to and assume the same speed V1 as belt 13.

On receiving the relative position signal from photocell 64, and given the time taken for products 2 to slide down chute 38 and the speed V1 of belt 13, unit 65 determines the instant in which each product 2 in stream 7 reaches input 19, i.e. determines the phase F1 with which products 2 in stream 7 reach output 17, i.e. the phase with respect to which the products 2 in stream 6 must be offset by timing device 66 to prevent products 2 in streams 6 and 7 from being fed simultaneously by belt 13 to output 17. It should be pointed out that, on account of several variable factors, such as the traveling speed of conveyor 41 of device 5, and the extent to which products 2 are compacted between belts 44 and 45 of device 5, phase F1 is variable with time, and is determined by unit 65 for each product 2 in stream 7.

On receiving the position signal from photocell 63, unit 65 calculates, on the basis of the instantaneous position of edge 59 received from said position indicator, the time which would be taken by products 2 in stream 6 to reach output 17 after falling over edge 59 in that position, i.e. once products 2 in stream 6 have been fed to input 18 and drawn on to belt 13 by suction through port 29.

If the instant in which products 2 in stream 6 reach output 17 is found by unit 65 to coincide with phase F1, unit 65 activates actuator 69 of timing device 66 to delay or anticipate the fall of products on to belt 13 by increasing or shortening the length L of conveyor 41 of device 4. More specifically, actuator 69 moves carriage 67 along guides 68 in direction D2, i.e. moves portion 57 of plate 54 into the extracted operating position to increase length L of conveyor 41, or moves portion 57 into the withdrawn operating position to shorten length L. In both cases, the effect is that of varying the instant in which products 2 in stream 6 fall on to belt 13 and, hence, the instant in which products 2 reach output 17.

Though succession 9 of products 2 fed by belt 13 through output 17 is therefore formed by distributing device 8 operating on practically all of products 2 in stream 6 via timing device 66, this in no way impairs or slows down the transfer of products 2 from inputs 18 and 19 to output 17. Moreover, distributing device 8 provides for forming a succession 9 of products 2 at output 17 regardless of the size of products 2, and regardless of how products 2 are supplied to inputs 18 and 19.

Distributing device 8 may also be used to advantage with one main input 19 and with a number of secondary inputs 18, each comprising a respective timing device 66, and each cascade controlled by control unit 65 with respect to the other secondary inputs 18.

Figure 5:
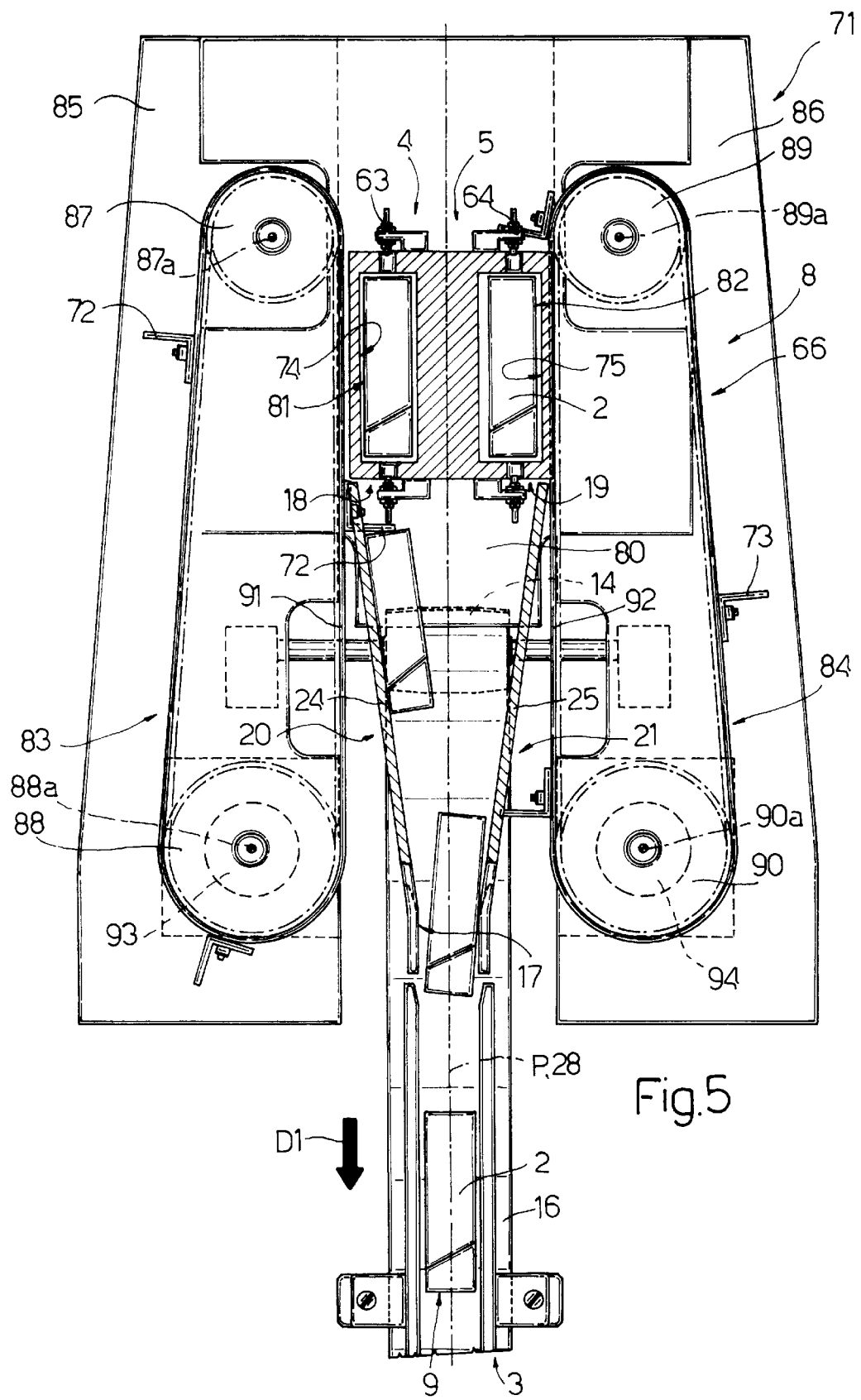
FIG. 5 shows a plan view, with parts in section and parts removed for clarity, of a second preferred embodiment of the unit according to the present invention.
Figure 6:
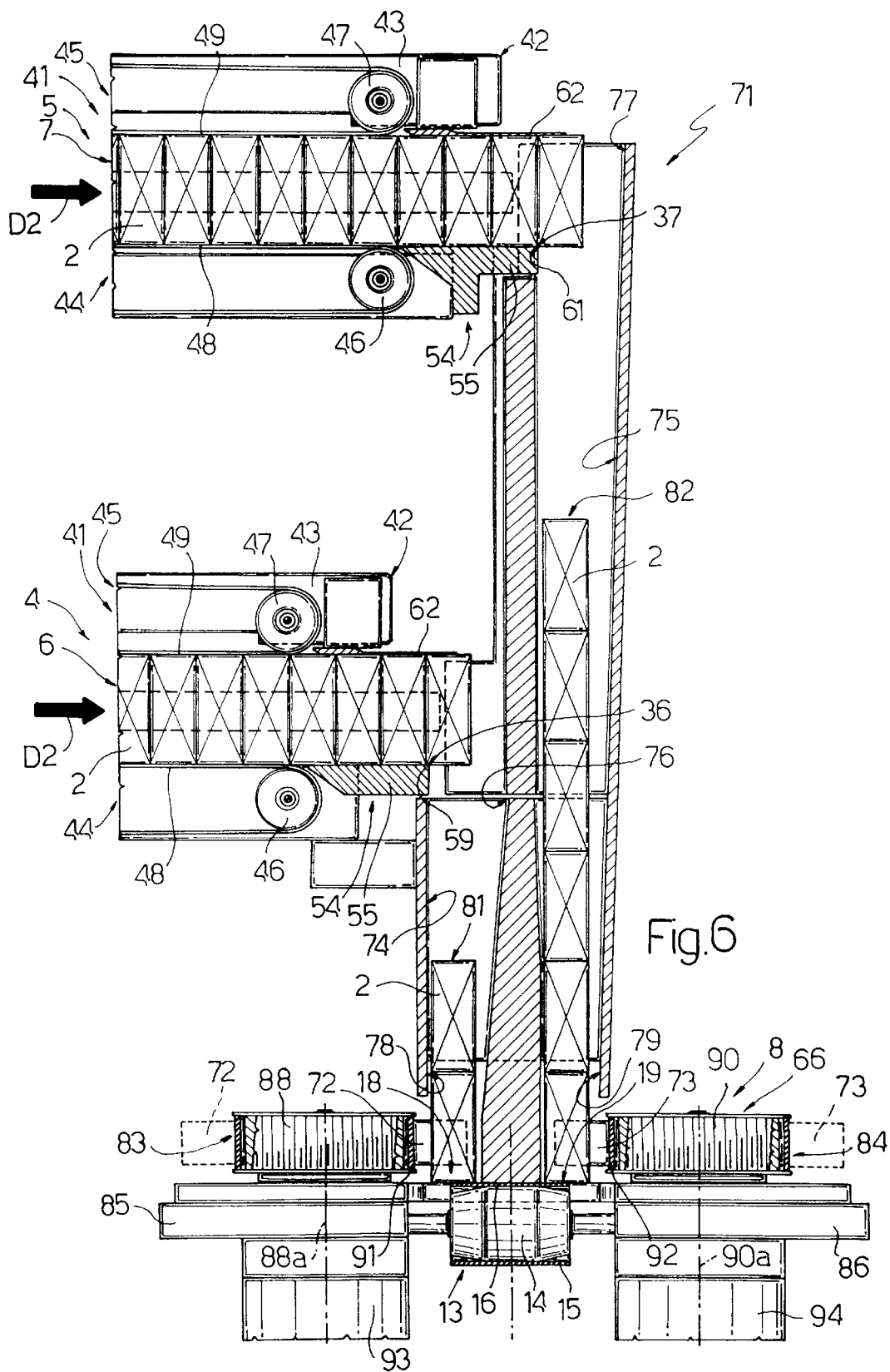
FIG. 6 shows a side view, with parts in section and parts removed for clarity, of the FIG. 5 unit.

The FIG. 5 and 6 embodiment shows a conveying unit 71 similar to unit 1, except that inputs 18 and 19 are located along path P at substantially the same distance from output 17, and timing device 66 comprises two numbers of plates 72 and 73 movable through inputs 18 and 19 to remove products 2 in respective streams 6 and 7 from inputs 18 and 19 and feed them on to belt 13.

More specifically, secondary conveying devices 4 and 5 of unit 71 comprise respective vertical dropdown channels 74 and 75 located side by side upstream from belt 13 in direction D1, and in turn comprising respective horizontal input openings 76 and 77 directly beneath respective openings 36 and 37, and respective horizontal output openings 78 and 79 directly over a plate 80, which is wider than belt 13, is shared by both channels 74 and 75, and combines with openings 78 and 79 of channels 74 and 75 to define inputs 18 and 19. Plate 80 is coplanar with transportation branch 16 of belt 13, extends beneath barriers 20 and 21 from output openings 78 and 79 to pulley 14, and is substantially tangent to branch 16 at pulley 14.

Channels 74 and 75 receive products 2 in respective streams 6 and 7 from respective devices 4 and 5, and feed products 2 by gravity on to plate 80 so as to form, internally, respective stacks 81 and 82 of products 2 positioned on edge one on top of the other. As devices 4 and 5 are located at different heights with respect to device 3 and plate 80, respective channels 74 and 75 are of different lengths, and respective input openings 76 and 77 are also located at different heights, whereas respective output openings 78 and 79 are located over plate 80 at a height equal to the width of product 2 so that at least the front and rear sides of each product 2 on plate 80 are left clear.

Timing device 66 comprises two endless belts 83 and 84 extending on plate 80 and on an initial portion of main conveying device 3. Belts 83 and 84 are fitted with respective plates 72 and 73, are in turn fitted to respective plates 85 and 86 located on either side of belt 13 and coplanar with branch 16, and are looped about respective pulleys 87, 88 and 89, 90 fitted in rotary manner to plates 85 and 86 so as to rotate about respective axes 87a, 88a and 89a, 90a crosswise to plates 85 and 86.

Pulleys 87 and 89 are located upstream from inputs 18 and 19, and pulleys 88 and 90 are located along path P at substantially the same height as output 17, and define, on belts 83 and 84 and together with pulleys 87 and 89, respective transportation branches 91 and 92 extending parallel to and alongside plate 80 and along an initial portion of device 3. More specifically, branches 91 and 92 are located directly facing inputs 18 and 19, between openings 78 and 79 and plate 80, and are separated from the lateral edges of belt 13 by a distance approximately equal to but no greater than the length of plates 72 and 73, so as to enable plates 72 and 73 to engage products 2 at inputs 18 and 19, and to cooperate with portions 24 and 25 of barriers 20 and 21 to release products 2 on branch 16 at output 17.

Timing device 66 also comprises two motors 93 and 94, which are located beneath plates 85 and 86, are timed with respect to each other, and are angularly integral with pulleys 88 and 90 to feed plates 72 and 73 through inputs 18 and 19 at a speed V2 substantially equal to speed V1. More specifically, plates 72 on belt 83 are offset with respect to plates 73 on belt 84, so that plates 72 and 73 are fed in offset manner through respective inputs 18 and 19 and output 17, and succession 9 is formed with no possibility of two products 2 becoming jammed at output 17.

In actual use, products 2 in streams 6 and 7 are fed by conveyors 41 of devices 4 and 5 into channels 74 and 75, by which they are fed by gravity on to plate 80.

Once fed on to plate 80, products 2 are engaged successively by plates 72 and 73, are withdrawn from respective channels 74 and 75 and respective stacks 81 and 82, and are fed on to belt 13. Plates 72 and 73 engage the rear sides of products 2, and push them along plate 80 towards output 17, where products 2, by now located on branch 16 of belt 13, are released completely by plates 72 and 73.

We claim:

1. A unit (1; 71) for conveying products (2), comprising:
main conveying means (3);
a first and at least a second secondary conveying means (4, 5) for respectively feeding a first and a second stream (6, 7) of products (2) to said main conveying means (3); and
distributing means (8) for so controlling said first and said second stream (6, 7) that the products (2) in the first stream (6), when fed to the main conveying means (3), are offset with respect to the products (2) in the second stream (7), in a single succession (9) of products (2) on a path (P) of the main conveying means (3),
wherein said main conveying means (3) comprises an output (17) for said succession (9) of products (2); a first input (18) for said first stream (6) of products (2) and a second input (19) for said second stream (7) of products (2), said first and said second input (18, 19) being located in series along said path (P) in a traveling direction (D1) of said main conveying means (3), said inputs (18, 19) comprising a main input (19) and at least one secondary input (18), wherein said distributing means (8) controls the stream (6) of products (2) fed through at least the secondary input (18), said distributing means (8) comprising first and second detecting means (63, 64) located respectively at said main input (19) and said secondary input (18), and timing means (66) controlled by said detecting means (63, 64) to control a phase of the products (2) in the stream (6) fed through the secondary input (18) as a function of a phase (F1) of the products (2) in the stream (7) fed through the main input (19), wherein said secondary conveying means (5) comprises a conveyor (41), and wherein said timing means (66) varies a length (L) of said conveyor (41).

2. A unit as claimed in claim 1, wherein said main conveying means (3) comprise one conveying device (3) extending along said path (P).

3. A unit as claimed in claim 2, wherein said first and second secondary conveying means (4, 5) are parallel to each other.

4. A unit as claimed in claim 1, wherein said conveyor (41) comprises a belt conveyor (44) in turn comprising a transportation branch (48) for conveying said products (2); and a plate (54) connecting the transportation branch (48) and said secondary input (18); said plate (54) comprising a movable portion (57) movable in a traveling direction (D2) of said transportation branch (48); and said timing means (66) comprising said movable portion (57), and actuating means (69) for moving the movable portion (57) to and from said transportation branch (48).

5. A unit as claimed in claim 4, wherein said plate (54) also comprises a fixed portion (55) adjacent to said transportation branch (48); said fixed and movable portions (55, 57) mating combfashion and in sliding manner with each other.

6. A unit as claimed in claim 2, wherein conveying device (3) comprises a conveyor belt (13) permeable to air; suction means (31) being provided beneath said belt (13) at each said input (18, 19).

7. A unit as claimed in claim 1, wherein said first and said second input (18, 19) are located along said path (P) at substantially the same distance from said output (17).

8. A unit as claimed in claim 7, wherein said secondary conveying means (4, 5) comprise respective dropdown channels (74, 75) for forming respective stacks (81, 82) of products (2); each channel (74, 75) communicating with said main conveying means (3) via said inputs (18, 19).

9. A unit as claimed in claim 8, wherein said distributing means (8) comprise extracting means (72, 73) offset with respect to one another to extract the products (2) from said dropdown channels (74, 75) and feed the products (2) to the main conveying means (3).

10. A unit as claimed in claim 9, wherein said distributing means (8) comprise stop means (80) for arresting said stacks of products (2) and facing said channels (74, 75); and conveying means (83, 84) extending along the stop means (80) and along an input portion of the main conveying means (3) to convey said extracting means (72, 73) through said inputs (18, 19).

11. A unit (1; 71) for conveying products (2), comprising main conveying means (3); a first and at least a second secondary conveying means (4, 5) for respectively feeding a first and a second stream (6, 7) of products (2) to said main conveying means (3); and distributing means (8) for so controlling said first and said second stream (6, 7) that the products (2) in the first stream (6), on reaching the main conveying means (3), are offset with respect to the products (2) in the second stream (7), so as to form a single succession (9) of products (2) on the main conveying means (3); said main conveying means (3) comprising an output (17) for said succession (9) of products (2); a first input (18) for said first stream (6) of products (2); and a second input (19) for said second stream (7) of products (2); said inputs (18, 19) comprising a main input (19) and at least one secondary input (18); said distributing means (8) controlling the stream (6) of products (2) fed, in use, through at least the secondary input (18); said distributing means (8) comprising first and second detecting means (63, 64) located respectively at said main input (19) and said secondary input (18); and timing means (66) controlled by said detecting means (63, 64) to control a phase of the products (2) in the stream (6) fed, in use, through the secondary input (18) as a function of a phase (F1) of the products (2) in the stream (7) fed, in use, through the main input (19); wherein the secondary conveying means (4) connected to said secondary input (18) comprise a conveyor (41); said timing means (66) being means for varying a length (L) of said conveyor (41).

12. A unit (1; 71) for conveying products (2) comprising main conveying means (3); a first and at least a second secondary conveying means (4, 5) for respectively feeding a first and a second stream (6, 7) of products (2) to said main conveying means (3); and distributing means (8) for so controlling said first and said second stream (6, 7) that the products (2) in the first stream (6), on reaching the main conveying means (3), are offset with respect to the products (2) in the second stream (7), so as to form a single succession (9) of products (2) on the main conveying means (3); said main conveying means (3) comprising an output (17) for said succession (9) of products (2); a first input (18) for said first stream (6) of products (2); and a second input (19) for said second stream (7) of products (2); wherein said main conveying means (3) define a path (P) along which the products (2) in said two streams (6, 7) are fed to said output (17); said main conveying means (3) comprising one conveying device (3), which extends along said path (P) and comprises a conveyor belt (13) permeable to air; suction means (31) being provided beneath said belt (13) at each said input (18, 19).

* * * * *